US008849665B2

(12) United States Patent
Bangalore et al.

(10) Patent No.: US 8,849,665 B2
(45) Date of Patent: Sep. 30, 2014

(54) SYSTEM AND METHOD OF PROVIDING MACHINE TRANSLATION FROM A SOURCE LANGUAGE TO A TARGET LANGUAGE

(75) Inventors: Srinivas Bangalore, Morristown, NJ (US); Emil Ettelaie, Los Angeles, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1606 days.

(21) Appl. No.: 12/022,819

(22) Filed: Jan. 30, 2008

(65) Prior Publication Data

US 2009/0192781 A1 Jul. 30, 2009

(51) Int. Cl.
*G10L 15/00* (2013.01)
*G10L 15/18* (2013.01)
*G06F 17/28* (2006.01)

(52) U.S. Cl.
CPC .................. *G06F 17/2827* (2013.01)
USPC ............ 704/251; 704/2; 704/5; 704/8; 704/9; 704/10; 704/E15.022

(58) Field of Classification Search
CPC .............. G06F 17/2735; G06F 17/277; G06F 17/2775; G06F 17/2881; G06F 17/289; G06F 17/272; G06F 17/2818; G06F 17/271; G06F 17/275; G06F 17/2827
USPC ........................ 704/251, 1–10, 277
See application file for complete search history.

(56) References Cited

U.S. PATENT DOCUMENTS

| | | | | |
|---|---|---|---|---|
| 5,285,386 A | * | 2/1994 | Kuo | 704/2 |
| 5,289,375 A | * | 2/1994 | Fukumochi et al. | 704/2 |
| 5,477,451 A | * | 12/1995 | Brown et al. | 704/9 |
| 5,515,292 A | * | 5/1996 | Roy et al. | 716/109 |
| 5,625,553 A | * | 4/1997 | Kutsumi et al. | 704/2 |
| 5,768,603 A | * | 6/1998 | Brown et al. | 704/9 |
| 5,848,385 A | * | 12/1998 | Poznanski et al. | 704/4 |
| 5,848,386 A | * | 12/1998 | Motoyama | 704/5 |
| 6,167,369 A | * | 12/2000 | Schulze | 704/9 |
| 6,208,956 B1 | * | 3/2001 | Motoyama | 704/2 |
| 6,233,545 B1 | * | 5/2001 | Datig | 704/2 |
| 6,330,530 B1 | * | 12/2001 | Horiguchi et al. | 704/4 |
| 6,393,389 B1 | * | 5/2002 | Chanod et al. | 704/7 |

(Continued)

OTHER PUBLICATIONS

Brown et al., P. F., "The Mathematics of Statistical Machine Translation: Parameter Estimation", Association for Computational Linguistics, vol. 19, pp. 263-311, 1993.*

(Continued)

*Primary Examiner* — Pierre-Louis Desir
*Assistant Examiner* — Abdelali Serrou

(57) ABSTRACT

A machine translation method, system for using the method, and computer readable media are disclosed. The method includes the steps of receiving a source language sentence, selecting a set of target language n-grams using a lexical classifier and based on the source language sentence. When selecting the set of target language n-grams, in at least one n-gram, n is greater than 1. The method continues by combining the selected set of target language n-grams as a finite state acceptor (FSA), weighting the FSA with data from the lexical classifier, and generating an n-best list of target sentences from the FSA. As an alternate to using the FSA, N strings may be generated from the n-grams and ranked using a language model. The N strings may be represented by an FSA for efficiency but it is not necessary.

24 Claims, 3 Drawing Sheets

(56) References Cited

U.S. PATENT DOCUMENTS

| | | | | |
|---|---|---|---|---|
| 6,470,306 | B1* | 10/2002 | Pringle et al. | 704/3 |
| 6,885,985 | B2* | 4/2005 | Hull | 704/2 |
| 7,113,903 | B1* | 9/2006 | Riccardi et al. | 704/4 |
| 7,593,843 | B2* | 9/2009 | Aue et al. | 704/2 |
| 7,827,027 | B2* | 11/2010 | Wu et al. | 704/2 |
| 8,332,207 | B2* | 12/2012 | Brants et al. | 704/9 |
| 2003/0023422 | A1* | 1/2003 | Menezes et al. | 704/2 |
| 2003/0065502 | A1* | 4/2003 | Zhu et al. | 704/4 |
| 2004/0098247 | A1* | 5/2004 | Moore | 704/4 |
| 2005/0228640 | A1* | 10/2005 | Aue et al. | 704/9 |

OTHER PUBLICATIONS

Chelba et al., C. "Exploiting Syntactic Structure for Language Modeling" Proceedings of the Thirty-Sixth Annual Meeting of the Association for Computational Linguistics and Seventeenth International Conference on Computational Linguistics, pp. 225-231, 1998.*

Chanod et al., "A Non-deterministic Tokenister for Finite-State Parsing", proceedings of the ECAI '96 (European Conference on Artificial Intelligence), Aug. 11-12, 1996, Budapest.*

Stephan Kanthak et al. "Novel Reordering Approaches in Phrase-Based Statistical Machine Translation" Proceedings of the ACL Workshop on Building and Using Parallel Texts, pp. 167-174, Ann Arbor, Jun. 2005. © Association for Computational Linguistics, 2005.

Srinivas Bangalore et al. "Statistical Machine Translation through Global Lexical Selection and Sentence Reconstruction", Proceedings of the ACL, Jun. 2007, pp. 152-159.

* cited by examiner

SYSTEM AND METHOD OF PROVIDING MACHINE TRANSLATION FROM A SOURCE LANGUAGE TO A TARGET LANGUAGE

BACKGROUND OF THE INVENTION

1. Field of the Invention

This invention relates to language translation. More particularly, this invention relates to automatically translating from a source language to a target language using machine translation.

2. Introduction

Machine translation (MT) has been extensively formulated as a combination of selecting appropriate target-language lexical items and reordering them to form a syntactically correct target sentence. Most of the statistical MT systems rely on local lexical associations between source and target words and therefore strongly depend on word alignment algorithms as an essential part of their training procedure. This type of word associations has also been extended to ordered groups of words (so called phrases) in phrased-base MT systems. This extension not only leads to a better lexical selection, but also some of the word ordering information that is captured in the source-target phrase association makes the ordering part of the translation task easier. However, the translation quality of these classes of approaches depends on the accuracy of the alignment algorithm.

On the other hand, lexical items can be chosen based on the whole source sentence rather than a segment of it. In the Global Lexical Selection (GLS) approach a bag of target words are selected for each source sentence and then, using a language model, a proper arrangement of the words is produced as the target sentence. Thus, using the global information can lead to a better lexical accuracy while eliminating the need for word alignment completely.

Using the entire sentence, gives the GLS model the ability to incorporate some lexico-syntactic information. For instance, in some languages the verb changes according to the subjects gender. In a phrase-based MT system, if the distance between subject and verb exceeds the span of the phrase window, the system would fail to select the correct verb form. In GLS, on the other hand, the subject information is considered while selecting the verb. Generally, more conceptual information are extracted from the source and used to choose the target lexicon. As a result, GLS has better ability to cope with cases when a source concept needs to be expressed with more than one phrase in the target language.

The statistical association between a target word and the source sentence c can be described by the conditional probability $p(e_t|c)$ and therefore the target words can be ranked and eventually selected based on the above posteriori information. Given a source sentence, the presence or absence of each target word in the vocabulary is decided by a binary classifier. A maximum entropy model is used and the classifiers are trained with a selection of source n-grams as the model features.

For word ordering, the GLS system relies on constrained permutations to create variants that are rescored using a target language model. A significant drawback of this approach is that larger permutation windows are necessary for better translation quality, but the complexity of permutation limits the size of the window that is computationally practical.

SUMMARY

Unlike the permutation technique, the embodiments of the present invention are preferably implemented in Finite State Machine (FSM) framework and therefore can be integrated in any application with a need for translating lattices instead of strings, as in speech-to-speech translation. The smaller reordering latency of these methods can also be a significant benefit to speech translation task where only a small delay is tolerable. The embodiments of the present invention can be tuned using the standard optimization algorithms in MT to produce higher quality translations.

Embodiments include systems, methods and computer readable media for a machine translation method. The method embodiment illustrates the scope with respect to it and the other embodiments as well. The method includes receiving a source language sentence and selecting, using a lexical classifier and based on the source language sentence, a set of target language n-grams, wherein in at least one n-gram, n is greater than 1. N strings generated from the set of target language n-grams are ranked using a language model. The N strings may or may not be represented as a finite state acceptor (FSA). Next, the method includes generating an n-best list of target sentences based on the ranked N strings. If an FSA is used, the method may include combining the selected set of target language n-grams as an FSA and weighting the FSA with data from the lexical classifier.

A machine translation method, system for using the method, and computer readable media are disclosed. The method includes the steps of receiving a source language sentence, selecting a set of target language n-grams using a lexical classifier and based on the source language sentence. When selecting the set of target language n-grams, in at least one n-gram, n is greater than 1. The method continues by combining the selected set of target language n-grams as a finite state acceptor (FSA), weighting the FSA with data from the lexical classifier, and generating an n-best list of target sentences from the FSA. As an alternate to using the FSA, N strings may be generated from the n-grams and ranked using a language model. The N strings may be represented by an FSA for efficiency but it is not necessary.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
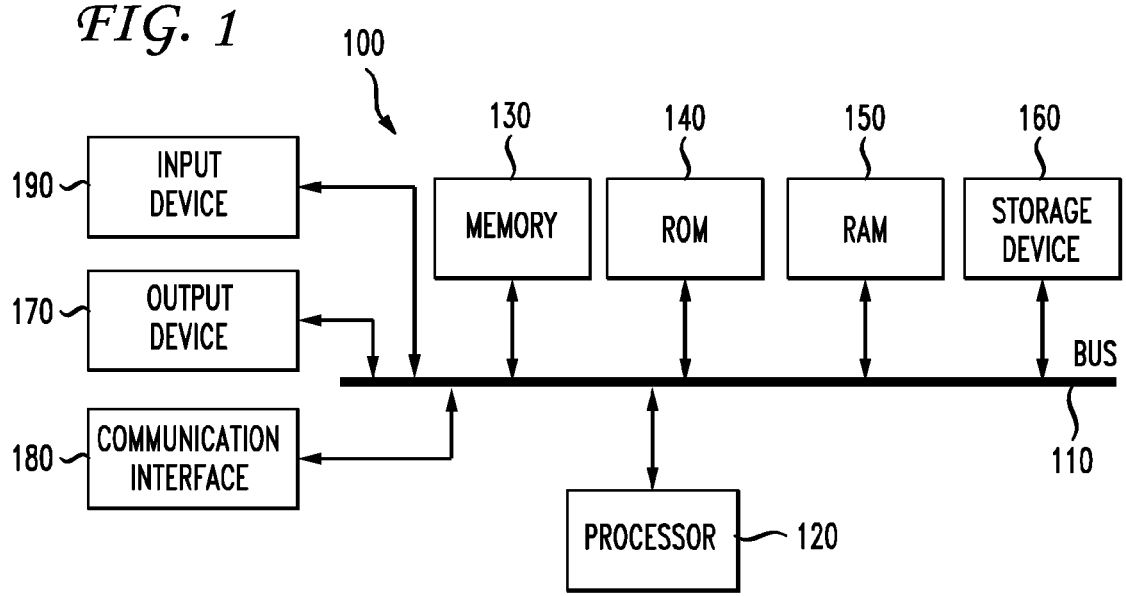
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed. As used herein, the terms system, computing device, and/or apparatus do not cover just software per se but require a hardware component. Thus, modules or functional blocks involve software controlling associated hardware elements.

For clarity of explanation, the illustrative system embodiment is presented as comprising individual modules or functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
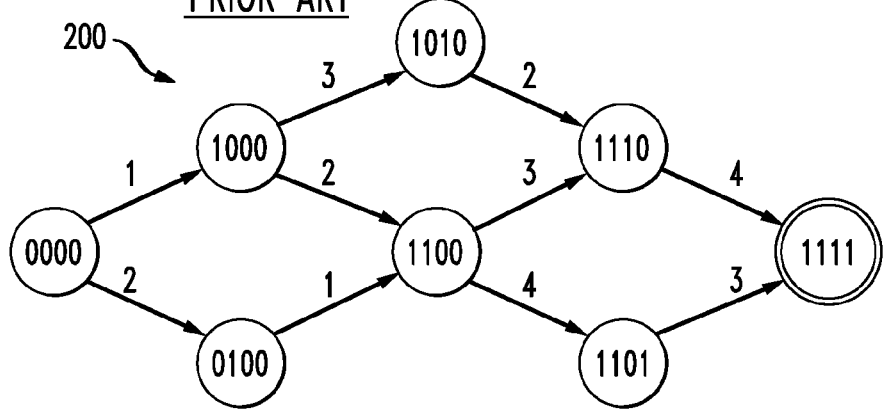
FIG. 2 illustrates a prior art locally constrained permutation automation for a four word sentence with a window of two words.

FIG. 2 is a schematic representation of a prior art method 200 of reordering the words after a translation. In method 200, a constrained permutation method is used to generate the target sentence with correct word ordering. The words produced by the classifier are permuted within a window of limited length and a language model is used to measure the quality of the resulting sentences. The size of the window can be adjusted to produce the best results. The implementation of a permutation automaton is shown as a finite state acceptor (FSA) network in FIG. 2. This network is built for a four word sentence and has a window of length two.

Method 200 does not utilize any information from the source sentence and relies only on permutation and the target language model to reconstruct the sentence. In contrast to the bag of words approach, in the present invention lexical classifiers are trained to produce bags of target language n-grams, in order to recover some target word order information. For this purpose, each source sentence is associated with the target sentence n-grams and the maximum entropy classifiers are trained. For instance, to generate trigrams, the target language sentence "Can I have a table." is replaced with:

<s>_can_i can_i_have i_have_a have_a_table_. table_._</s>

Adding the start and end tokens (<s> and </s>) provides a reference for the reconstruction process. The target sentence can be constructed by stitching the n-grams produced by the classifier. The lower order n-gram classifiers can also be created to supply a bag of multiple order n-grams for a back-off scheme.

In one embodiment of the present disclosure, for each source sentence, the selected n-grams can be combined as an FSA. To form such an FSA, one can begin with the n-grams that have the start token and continue by adding the next matching n-gram. That way, each node represents an n−1 length word history and the edges leaving it are labeled with the words that follow that history. An n-gram with the end token will be represented with an </s> labeled edge connecting the history node to the final state node. The output of n strings from a set of target n-grams may not be represented as an FSA, however, in that other representations may be used.

Figure 3:
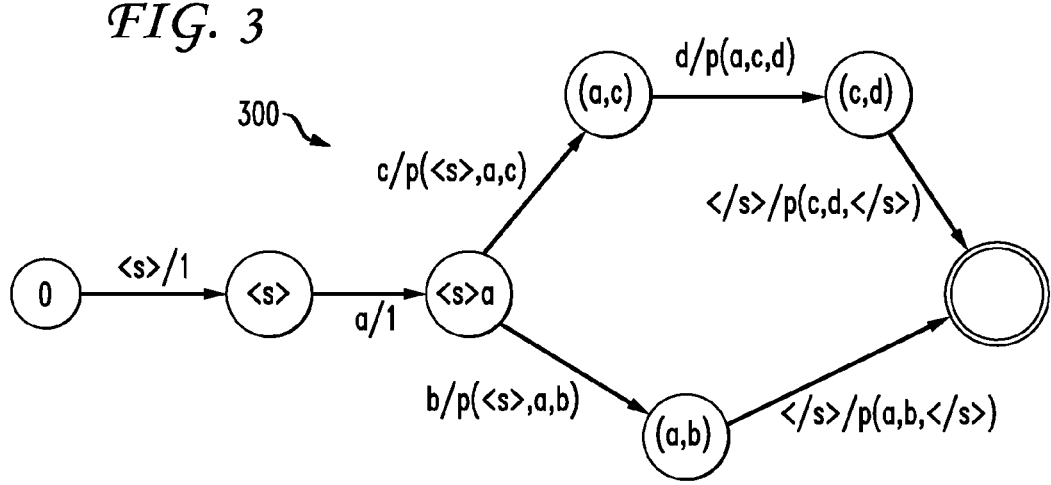
FIG. 3 illustrates an embodiment of a network formed using trigrams.

FIG. 3 is an example of the network 300 creation procedure. For simplicity, letters are used to represent the words. If the trigram classifier generates <s>_a_c, a_c_d, c_d_</s>, <s>_a_b, and a_b_</s> the corresponding network is shown in FIG. 3.

The classifier must be set up to generate a list of every n-gram in the training data set along with its classification score. These scores are used to weight the corresponding edges. Therefore, such a network would cover every n-gram that is seen in the training corpus. Once composed with a language model, the network can generate an n-best list of target sentences by combining the classification scores and the language model scores.

Since for every seen n-gram, there is an edge in the network, all the paths would terminate in the final node. However, not every n word combination is guaranteed to be generated, as the network only supports the n-grams contained in the training corpus.

In fact this method makes use of the source information in two different ways: first, n-grams carry some ordering information and second, it fully exploits the classifier's scores.

The ability of the above method to generate various word combinations is limited by the set of n-grams from the training corpus. This lack of flexibility is due to the absence of any back-off scheme. In another embodiment, an efficient way to cope with the above problem is to use different orders of n-grams in the network construction process. N different classifiers can be trained to produce all orders of word combinations from unigrams to n-grams. The union of the outputs of these classifiers is a rich set of raw material for sentence construction. The vocabulary covered by the network is the list of all single words in that set.

Figure 4:
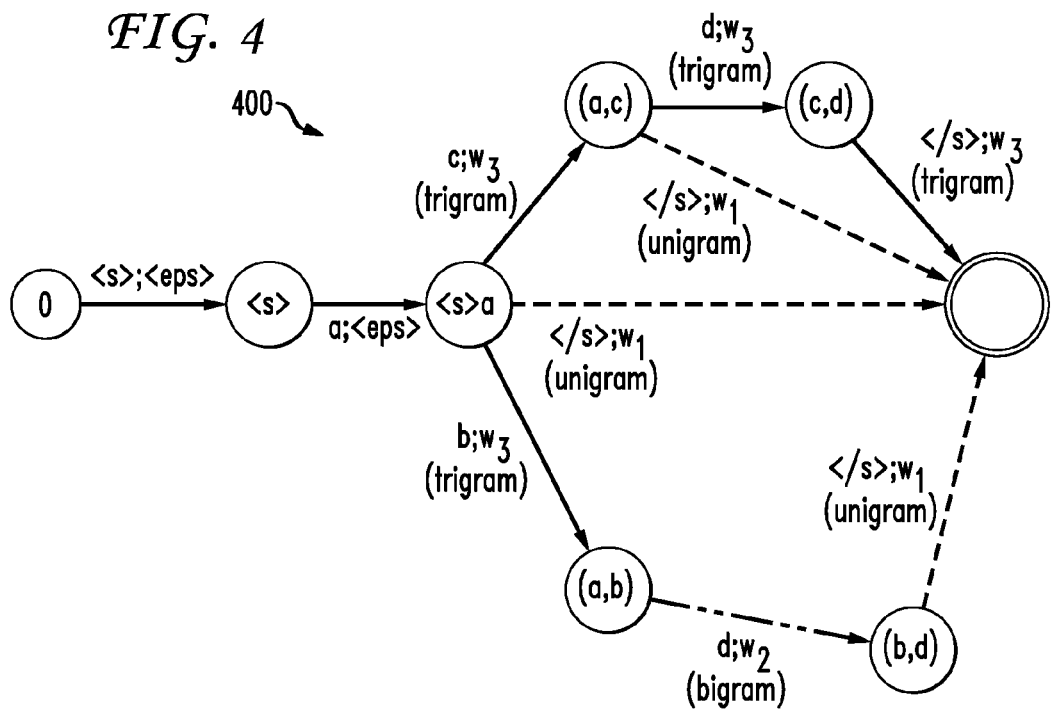
FIG. 4 illustrates an embodiment of a network formed using back-off.

FIG. 4 is a schematic of the network 400 formed using a back-off function. To form the network, nodes are chosen to represent a history of n−1 words similar to the previously described embodiment. For a vocabulary of size M there would be at most, $M^n-1$ of such nodes. For each n-gram an edge connects the corresponding nodes. In case when an n-gram is absent, two nodes are connected using lower order combinations, from (n−1)-grams to unigrams respectively. Therefore every two nodes are connected with an edge that represents the highest order of word combination that is present in the construction set. There could be nodes with no direct connection. FIG. 4 depicts the construction of such a network. By assuming no a_b_</s> trigram and adding the end token as a unigram and b_d as a bigram to the example of FIG. 3, a new network is formed that encompasses a few back-off paths (broken lines in FIG. 4). To keep track of the number of different orders of n-grams in each composed path, the network is formed as a transducer (FST). Each edge has an output label that indicates the order of the n-gram that it represents ($w_1$, $w_2$, and $w_3$ in this example).

The classification scores cannot serve as the edge weights in these type of networks. This is due to the fact that these numbers are generated by different classifiers with different model orders and are not comparable. A solution would be to weigh all the edges of the same order uniformly, e.g., all the edges that represent trigrams would have the same weight and those associated with bigrams would be weighed equivalently and so on. This of course would introduce two new problems. Firstly, it leaves the network with (at least) n unknown parameters to be set. The other problem is the lack of any preference measure among the same order n-grams. Every n-gram of the same order is weighted similarly; there is no discrimination between the properly selected and less relevant n-grams. Cutting out the least favorable n-grams can eliminate the problem to some extent. Here, the distribution of posteriori scores over all possible n-grams generated by a classifier is approximated by a step function. In other words, if such a distribution for an n-gram classifier, and for a source sentence c is called $p_n(.|(c))$, it is assumed that it can be approximated by $$\hat{p}_n(e_i | c) = \begin{cases} 1 & p_n(e_i | c) > \theta \\ 0 & \text{elsewhere} \end{cases} \quad (1)$$

for every n-gram $e_i$ in the classifier range. Parameter $\theta$ is the cutoff threshold that needs to be set for each classifier. The optimum settings for these cutoff thresholds are explained in below.

Although this model provides greater flexibility by means of a back-off scheme, it has two limitations. First, the classification scores are not used in the network construction and second, the cutoff thresholds are to be selected using a development corpus.

In the above embodiments, short paths tend to have higher scores than the longer ones, given that the edge weights are less than one. Therefore the n-best selection of the paths would consist of very short sentences. In order to avoid that, a word insertion model is necessary to compensate for short paths.

Figure 5:
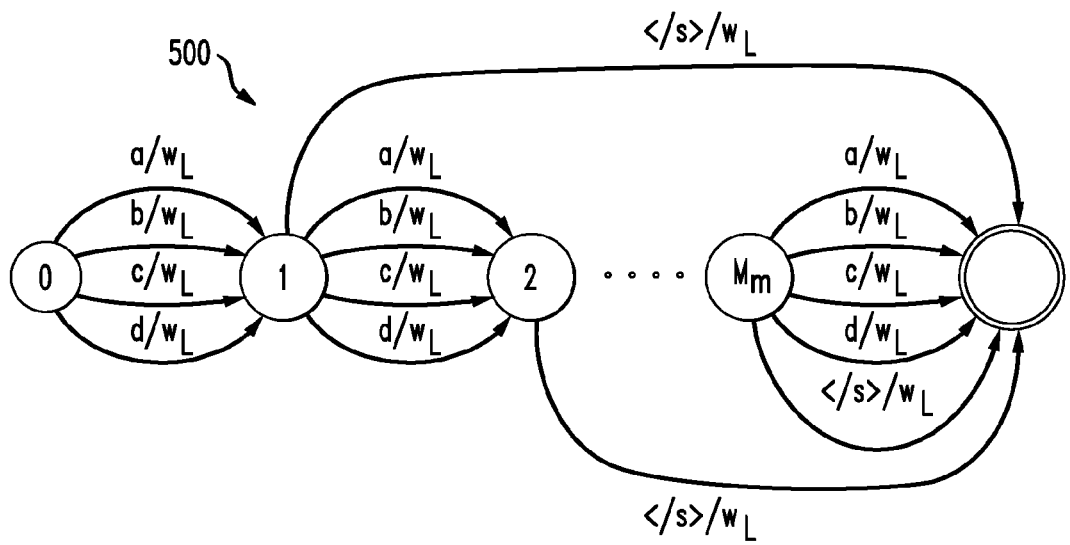
FIG. 5 illustrates a word insertion model for the network of FIG. 3.

First, the maximum number of allowable words in a sentence is set ($M_{max}$). This can be a pre-selected number for a corpus or chosen dynamically, e.g., depending on the length of the source sentence. Then an FSA network is built with $M_{max}+1$ ordered states. For every word in the vocabulary, there is an edge connecting each state to the next one. All the states are also connected to the final state by an edge labeled with the end of sentence token. FIG. 5 shows a network for the example in FIG. 3.

This network allows generation of any string of words up to the length $M_{max}$. The edge weights are all the same and is a parameter to be selected. If the weight is chosen to be greater than one, then the network would generate longer sentences.

Similar to most of the machine translation frameworks, our approach also relies on the target language model for word selection and ordering. In practice, the ordering network must be composed with a target language model FST. The effectiveness of the language model is controlled by an exponential mixture factor. This factor lets the language model score be emphasized (or deemphasized).

Each embodiment requires some parameters to be set. The final score of every target hypothesis is a linear combination (in log domain) of these parameters. For the weighted n-gram network model, the total score of a target hypothesis e can be expressed as the following log-linear model.

$$S_t(e) = S_{NG}(e) + w_{LM} S_{LM}(e) + w_L S_L(e) \quad (2)$$

where $S_{LM}(e)$ and $S_L(e)$ are the language model score and the length (number of words) of the hypothesis e respectively, and $S_{NG}(e)$ is the score from the weighted n-gram network. Parameters $w_{LM}$ and $w_L$ are the language model exponential mixture factor and word insertion weight respectively. These parameters need to be set through an optimization process.

The total score for the system with backed-off n-gram network would be similar to Eq. 2. The n-gram network score however, is a linear combination of the number of different order n-grams constructing the hypothesis, i.e., $$S_{NG}(e) = \sum_{i=1}^{n} w_i f_i(e) \quad (3)$$

Here, $f_i(e)$ is the number of $i^{th}$ order n-grams (or i-grams) from the network that are used to construct e and $w_i$ is the weight of the edges representing them. These weights must also be chosen optimally. The scoring mechanism is linear with respect to all the above parameters. This linearity can be exploited to simplify the optimization process.

Although the quality of translation is also dependent on classifiers cut-off thresholds, the relation between the output hypothesis and these parameters cannot be modeled as a linear combination. Therefore a model-free optimization technique is needed to set these non-linear parameters.

The common choice of an objective function for optimization is the BLEU score. Therefore the parameters are to be tuned in a way that maximizes that score.

The algorithm of choice has been the Minimum Error Rate Training algorithm of although any machine translation optimization algorithm may be used. Using linearity, the algorithm divides the search space by a grid and limits the search solely to the points that change the ranking of the hypotheses.

The Simplex algorithm has also been used for the tuning of the machine translation systems. Since the algorithm is model-free it can be used to set the parameters independent of their type relation to the objective function.

Figure 6:
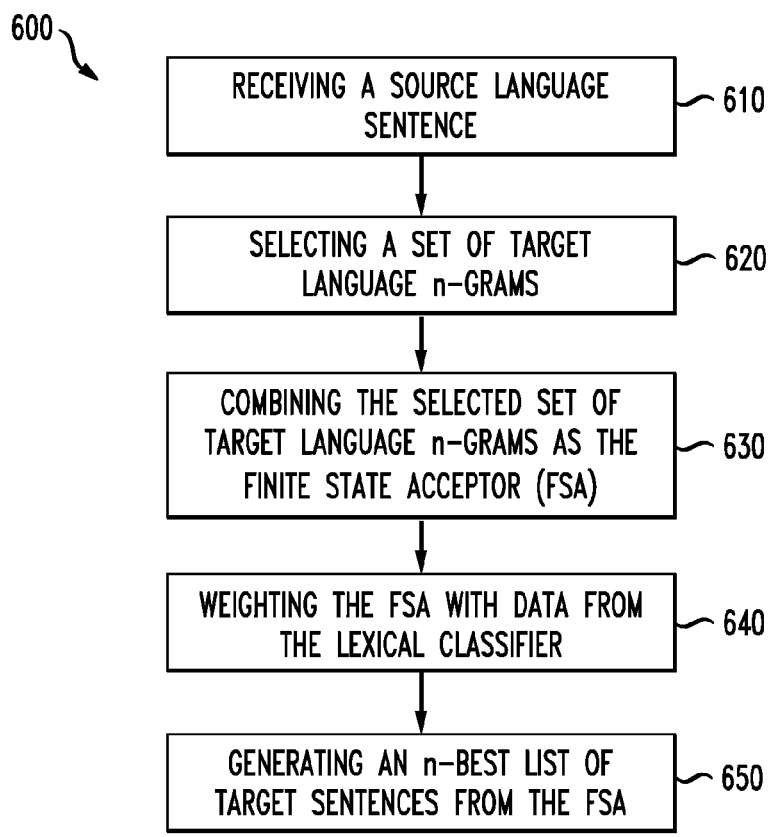
FIG. 6 is a flowchart of an embodiment of the method of the present invention.

FIG. 6 is a flow chart of a method 600 of an embodiment of the present invention. The first step in method 600 is to receive a sentence in a source language 610. Then, using a lexical classifier and source language sentence 610, a set of target language n-grams are selected 620. In the set of target language n-grams 620, in at least one n-gram, n is greater than one. The lexical classifier may generate a classification score for each n-gram in a set of training data and the FSA may be composed with a language model.

The next step in method 600 is to combine the selected set of target language n-grams as the FSA 630. The FSA is then weighted with data from the lexical classifier 640 and an n-best list of target sentences is generated from the FSA 650. The FSA may generate the n-best list of target sentences by combining the classification scores and the language model scores. In generating the n-best list of target sentences from the FSA, classification scores generated by the lexical classifier may be combined with the language model scores generated by the language model used to compose the FSA.

The FSA may be comprised of two or more nodes that are connected by edges. Each edge may represent a different n-gram and each node may represent an n−1 length word history. The edges leaving each node may be labeled with the words that follow that history. At least one n-gram may include an end token that is represented by a symbol labeled edge connecting the history node to the final state node. Additionally, if there is no n-gram available to connect two nodes, a lower order-gram may be used to connect the nodes.

As an alternate to using an FSA, the method may include ranking, using a language model, N strings generated from the set of target language n-grams and generating an n-best list of target sentences based on the ranked N strings. Thus, the scope of the invention may encompass a number of different ways of recovering the n-best target sentences from the lexical classifier output. An FSA is a preferable method used to represent the N strings for efficient ranking but one may deal with individual strings and compute their language model score which can be used for ranking purposes.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code portions in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code portions for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:
1. A method comprising:
   selecting, via a processor using a lexical classifier, a bag of target language n-grams associated with a source language sentence, wherein the bag of target language n-grams comprises a beginning n-gram having a start token in a first word position, and an ending n-gram having an end token in a second word position, the end token connecting a history node to a final state node;
   combining the bag of target language n-grams to yield an n-gram network;
   ranking N strings in the n-gram network using a language model to yield an n-best list of target sentences; and
   generating, via the processor, a target sentence based on the n-best list.

2. The method of claim 1, wherein the lexical classifier generates a classification score for each of a plurality of n-grams in a set of training data.

3. The method of claim 2, wherein the N strings are represented by a finite state acceptor composed with the language model.

4. The method of claim 3, wherein the finite state acceptor generates the n-best list of target sentences by combining the classification score for each of the plurality of n-grams and a respective language model score.

5. The method of claim 3, wherein the finite state acceptor comprises two nodes, wherein each of the two nodes is connected to another node with an edge that represents an n-gram.

6. The method of claim 5, wherein each of the two nodes represents an n−1 length word history, and wherein the edge is labeled with a word that follows the n−1 length word history.

7. The method of claim 6, wherein a lower order-gram is used to connect the two nodes.

8. The method of claim 7, wherein the edge indicates what order n-gram it represents.

9. A system comprising:
a processor; and
a computer readable storage medium storing instructions which, when executed by the processor, cause the processor to perform a method comprising:
receiving a source language sentence;
selecting, via a lexical classifier, a set of target language n-grams associated with the source language sentence, wherein the bag of target language n-grams comprises a beginning n-gram having a start token in a first word position, and an ending n-gram having an end token in a second word position, the end token connecting a history node to a final state node;
combining the set of target language n-grams to yield an n-gram network;
ranking N strings in the n-gram network using a language model to yield an n-best list of target sentences; and
generating a target sentence based on the n-best list.

10. The system of claim 9, wherein the lexical classifier generates a classification score for each of a plurality of n-grams in a set of training data.

11. The system of claim 10, wherein the N strings are represented by a finite state acceptor composed with the language model, and wherein the finite state acceptor generates the n-best list of target sentences by combining the classification score for each of the plurality of n-grams and a respective language model score.

12. The system of claim 11, further comprising generating the n-best list of target sentences by combining the classification score for each of the plurality of n-grams and a plurality of language model scores generated by the language model used to compose the finite state acceptor.

13. The system of claim 11, wherein the finite state acceptor comprises two nodes, wherein each of the two nodes is connected to another node with an edge that represents an n-gram.

14. The system of claim 13, wherein each of the two nodes represents an n−1 length word history, and wherein the edge is labeled with a word that follows the n−1 length word history.

15. The system of claim 14, wherein a lower order-gram is used to connect the two nodes.

16. The system of claim 15, wherein the edge indicates what order n-gram it represents.

17. A computer-readable storage device having instructions stored which, when executed by a computing device, causes the computing device to perform operations comprising:
receiving a source language sentence;
selecting, via a lexical classifier, a bag of target language n-grams associated with the source language sentence, wherein the bag of target language n-grams comprises a beginning n-gram having a start token in a first word position, and an ending n-gram having an end token in a second word position, the end token connecting a history node to a final state node;
combining the bag of target language n-grams to yield an n-gram network;
ranking N strings in the n-gram network using a language model to yield an n-best list of target sentences; and
generating a target sentence based on the n-best list.

18. The computer-readable storage device of claim 17, wherein the lexical classifier generates a classification score for each of a plurality of n-grams in a set of training data.

19. The computer-readable storage device of claim 18, wherein the N strings are represented by a finite state acceptor composed with the language model.

20. The computer-readable storage device of claim 19, further comprising generating the n-best list of target sentences by combining the classification score for each of the plurality of n-grams and a respective language model score.

21. The computer-readable storage device of claim 19, wherein the finite state acceptor comprises two nodes, wherein each of the two nodes is connected to another node with an edge that represents an n-gram.

22. The computer-readable storage device of claim 21, wherein each of the two nodes represents an n−1 length word history, and wherein the edge is labeled with a word that follows the n−1 length word history.

23. The computer-readable storage device of claim 22, wherein a lower order-gram is used to connect the two nodes.

24. The computer-readable storage device of claim 23, wherein the edge indicates what order n-gram it represents.

* * * * *